Aug. 6, 1957

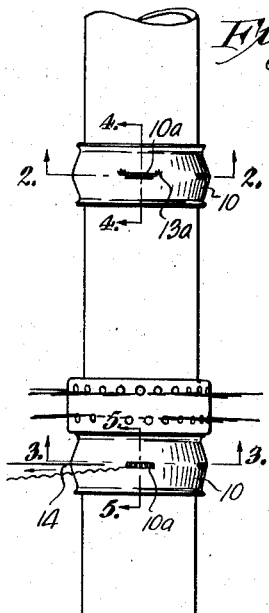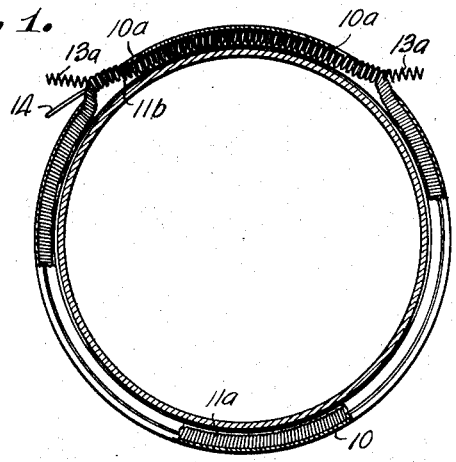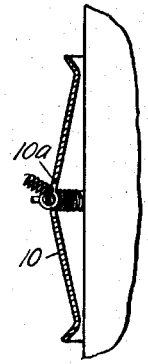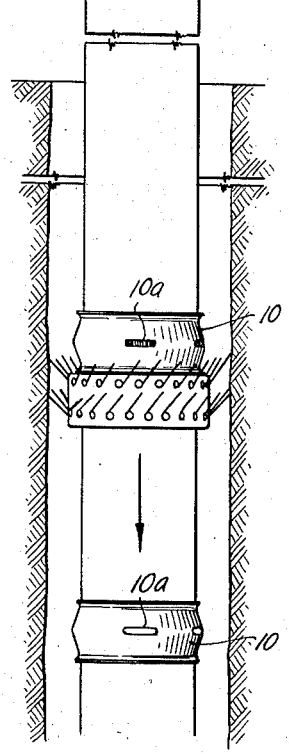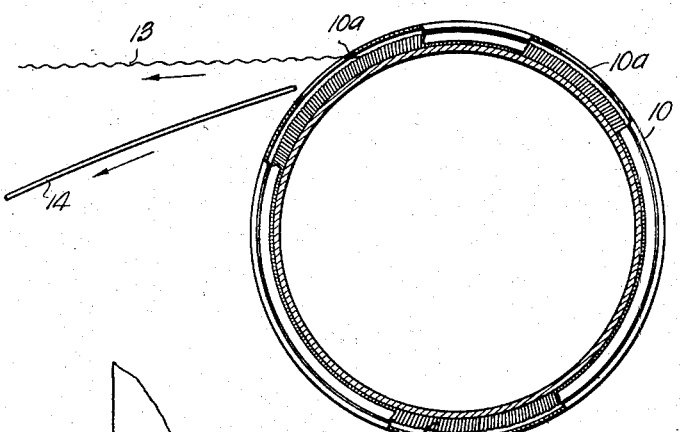

J. E. HALL, SR.

2,801,700

STOP COLLAR ASSEMBLY

Filed Feb. 23, 1952

INVENTOR.
Jesse E. Hall, Sr.
BY
Thos. E. Scofield
ATTORNEY.

United States Patent Office 2,801,700
Patented Aug. 6, 1957

2,801,700
STOP COLLAR ASSEMBLY
Jesse E. Hall, Sr., Weatherford, Tex.
Application February 23, 1952, Serial No. 273,005
8 Claims. (Cl. 166—243)

This invention relates to improvements in a stop collar assembly for mounting tools on the exterior pipe or casing and refers more particularly to an abutment device employing a coil spring within a tapered race which wedges against inclined surfaces of the collar or sleeve to fix the device rigidly upon the pipe or casing at any desired location.

This application is a continuation-in-part of application Serial No. 256,194, filed November 14, 1951.

In applying tools such as scratchers and centralizers to the exterior of casing to be cemented in an oil well, if the tool is to be permitted to rotate or have a restricted longitudinal movement along the pipe, it is usual practice to weld lugs at spaced intervals upon the exterior of the pipe immediately above and below the tool to serve as abutments for the tool as the casing is moved longitudinally in the well bore.

The difficulty of mounting tools in this manner is the expense of having available welding equipment to affix the lugs to the casing, and if care is not used, the pipe may be weakened at the location of the welds. Also, considerable time and labor is necessary to perform the welding job necessary to apply a number of tools to the casing where the well bore is to be conditioned over a considerable length of the pipe.

The stop collar here proposed is adapted to be slid onto a section of pipe and positioned at any desired location. Then by merely removing a short length of wire and stripping a short length of coil spring through an aperture in the sleeve or collar, the stop collar assembly is rigidly affixed to the casing.

An objet of the invention therefore is to provide a stop collar assembly having a tapered internal surface acting as a race or wedge for a coil spring located within the collar.

Another object is to provide a stop collar assembly easily located at any desired position on the pipe and rigidly affixed thereto by stripping from the collar a short length of coiled wire.

A further object is to provide a stop collar assembly which may be removed from the casing by cutting it with a pair of tin snips or other metal-cutting tool.

Other and further objects will appear from the description which follows.

In the accompanying drawings which form a part of the specification and are to be read in conjunction therewith and in which like reference numerals indicate like parts in the various views:

Fig. 1 is a side elevational view of a section of casing being run into a well, showing the two stop collars below the ground level affixed to the pipe, the first stop collar above the ground level in the process of being affixed to the casing, the upper stop collar slidable on the pipe before being affixed to the exterior of the casing.

Fig. 2 is an enlarged horizontal section taken along the line 2—2 in Fig. 1 in the direction of the arrows.

Fig. 3 is an enlarged section taken along the line 3—3 in Fig. 1 in the direction of the arrows.

Fig. 4 is a vertical section taken through the collar along line 4—4 in Fig. 1 in the direction of the arrows.

Fig. 5 is a vertical section taken along the line 5—5 in Fig. 1 in the direction of the arrows.

Figure 6:
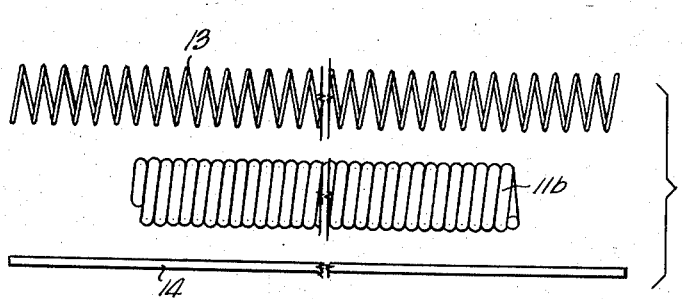
Fig. 6 is a disassembled view of the spreader spring, adjusting section of the coil spring and the holding wire.

As indicated hereinbefore, the stop collar to be described eliminates the necessity of welding lugs, rings or abutment pieces upon the exterior of the pipe or casing to hold tools at a proper location. In the conditioning of oil wells for cementing, for example, scratchers and centralizers must be located at intervals along the pipe in order that the abrading and centralizing tools properly cover the area to be cemented, as well as spacing the centralizers so the pipe or casing will be centered within the well bore.

The stop collars comprise a sleeve 10 which is formed with an enlarged midsection best shown in Figs. 4 and 5. The diameter of the midsection being greater than the diameter adjacent the edges of the sleeve forms inclined inner surfaces tapering from the midsection of the sleeve in both direction toward its edges. Midway between the latter edges the sleeve has a pair of elongated apertures 10a which are spaced circumferentially in the manner indicated in Figs. 2 and 3.

Within this stop collar or sleeve is a circumferential wedging element in the form of a garter band, this being a coil spring having a relatively long section 11a and a shorter section 11b; the shorter section lies generally in the region between the two openings 10a as will be clear from Fig. 2, and for convenience will be referred to as the adjusting section.

As explained in my prior application Serial No. 256,194, it is the function of the aforementioned garter band, in use, to snugly hug and grip the exterior of the well casing or pipe due to its elastic tension; under this condition it cooperates with the axially tapered interior surfaces of the sleeve 10 to limit axial movement of the sleeve along the pipe. Thus, as shown in solid lines in Fig. 5, the garter spring is jammed in the upper taper where it wedges between the collar and pipe to prevent further downward movement of the collar relative to the pipe, this being the position it occupies when the balance of forces is such as to urge the collar downwardly; on the other hand, if the balance of forces is such as to urge the collar upwardly (as, for example, due to the upward thrust imposed on it by a wire scratcher engaging the well bore while the pipe is moving downwardly, see lower portion of Fig. 1) the spring jams in the lower taper as shown by dotted lines in Fig. 5, thereby limiting such upward movement of the collar. Consequently, the collar 10 enjoys, at most, only very limited movement in either direction relative the pipe.

Figure 10:
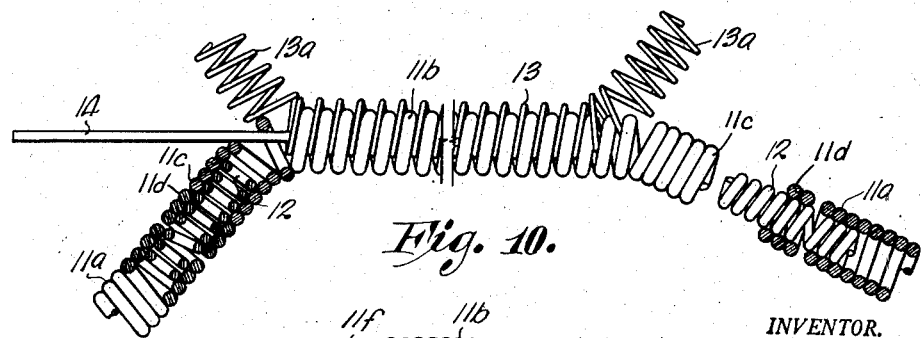
Fig. 10 is a view showing the manner of coupling the adjusting section with the longer section of the coil spring.

The garter band or wedging spring is, in effect, a circumferentially endless element, but for convenience it can be made in two separate sections 11a and 11b which are connected end to end by a pair of short coupling springs 12 shown in Fig. 10. Each of the latter springs is smaller in diameter so that it can be screwed into the adjoining ends of sections 11a and 11b, the interior and exterior coils in each case meshing in the manner of a threaded coupling. The end coils of the section 11a are indicated at 11d and the end coils of section 11b are indicated at 11c. It will be noted that the right hand end of section 11b is shown in the uncoupled relation with the coupling spring 12, thereby to clearly illustrate the nature of the structure. Certain of the coils adjacent the ends of section 11a are spread slightly to bind the inner coupling coils 12 and limit the distance that they may be screwed therein.

Figure 11:
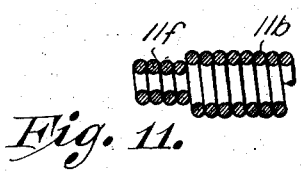
Fig. 11 is a modified type of coupling for connecting the adjusting section into the longer section of the coil spring.

Alternatively, as illustrated in Fig. 11, it is contemplated that the short coupling springs can be formed integral with the ends of the long section 11a as reduced diameter terminals 11f. While only one end of the section 11a is shown in Fig. 11, it will be understood that the other end is formed also with a terminal 11f. The terminals 11f are adapted to be screwed into the ends of the short section 11b and serve the same function as the coupling coils 12, previously described.

Figure 7:
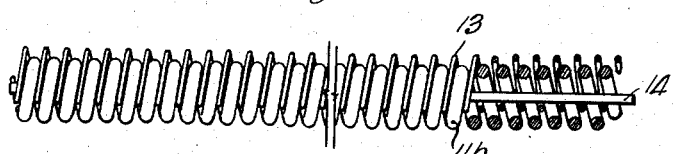
Fig. 7 is an assembled view of the parts shown in Fig. 6 showing the coils of the spreader spring and adjusting section intermeshed with a holding wire threaded therethrough.

In either case, bearing in mind that the garter band or wedging spring is tensioned to grip the pipe in actual use of my device, it will be apparent that for the purpose of preliminarily positioning the device on the pipe—that is to say, sliding the collar 10 and its associated garter band along the pipe to the desired location—it is necessary to hold the garter expanded against its normal tension so that it will be loose or slack on the pipe during the positioning operation. To stretch the garter band or wedge spring, a spreader spring 13 of smaller diameter wire and coils which are somewhat more spread apart than the coils of the wedge spring are intermeshed with the coils of the short adjusting section. In Fig. 6 is shown the spreader spring, the adjusting section of the wedge spring 11b (assuming this to be a separate part which is to be coupled to the balance of the garter band by means of coupling springs 12 as explained hereinbefore) and a holding wire 14. By stretching slightly the adjusting section, the coils of the spreader spring are interlocked with the adjusting section as shown in Fig. 7 which of course holds the adjusting section 11b in extended condition; then, the holding wire 14 is threaded through the coils of both springs to prevent their disengagement.

Figure 8:
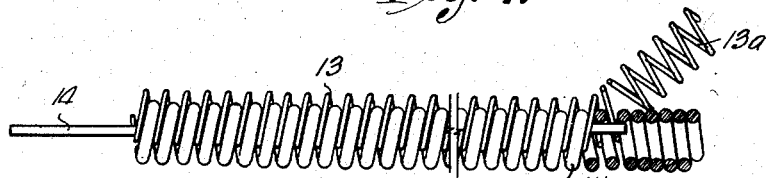
Fig. 8 is a view similar to that shown in Fig. 7 with the holding wire partially removed and an end of the spreader spring pulled from the coils of the adjusting section in the form of a pigtail.
Figure 9:
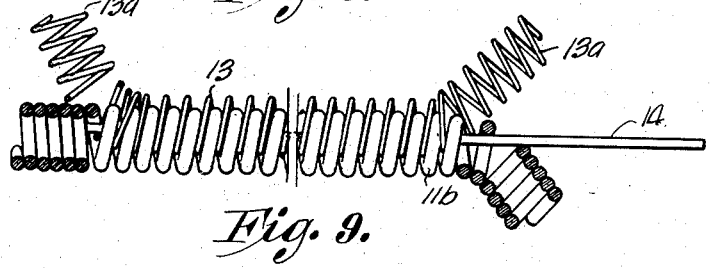
Fig. 9 is a view similar to that shown in Figs. 7 and 8 with the holding wire pulled in the opposite direction and both of the free ends of the spreader spring pulled from the coils of the adjusting section.

After intermeshing the coils of these springs in the manner described, the holding wire is slid longitudinally throuph the coils and one end of the spreader sprinp is disengaged from the adjusting section as shown in Fig. 8. The holding wire is then moved in the opposite direction to the extent that the opposite end of the spreader spring can be disengaged from the coils of the adjusting section in the manner shown in Fig. 9. The coupling coils 12 are screwed into the ends of the long section 11a of the wedge spring and then into the ends of the adjusting section 11b as shown in Fig. 10, to form the finished garter band.

After the long and short sections of the wedge spring have been coupled together, with the holding wire 14 maintaining the coils of the adjusting section and spreader spring intermeshed, the entire coil spring assembly is slipped into the sleeve as shown in Fig. 2. The coil spring is then rotated in the mid-section of the sleeve 10 until the pigtails 13a of the spreader spring are in registration with the apertures 10a and may be pulled through to expose the ends outside of the sleeve. Also, the one end of holding wire 14 must be located so that it can be pulled through one of the apertures of the sleeve. The manner in which the coil spring is positioned within the collar with the ends of the spreader spring and holding wire extending out through the apertures is shown in Fig. 2. By spreading the coils of the adjusting section of the wedge spring, the diameter of the spring is expanded to the extent that it lies closely against the inner surface of the midsection of the collar and when so positioned permits free movement of the collar along the pipe. When so positioned, the collar or sleeve may be slid onto the end of the pipe section and moved longitudinally to the desired location. When so positioned, the holding wire is withdrawn from the coils of the adjusting section through one of the apertures of the collar as indicated in Fig. 3. One of the pigtails 13a of the spreader spring is then pulled out through aperture 10a. Stripping the spreader spring from intermeshing engagement with the adjusting section releases the coils of the adjusting section so that they snap together in their original state as shown in Fig. 6. As the coils of the adjusting section are compressed together, the garter band will tightly grip the pipe as described hereinbefore; in other words the diameter of the circular wedge spring is reduced to the diameter of the pipe as shown in Fig. 5, at which time movement of the collar or pipe in either direction will wedge the spring against one of the inclined surfaces.

Thus, it will be seen that there has been provided a simple and effective abutment member easily applied to the exterior of a casing and slid into position along the pipe manually. When properly located, withdrawal of the holding wire and spreader spring through an aperture in the sleeve reduces the diameter of the wedge spring sufficiently to grip the pipe or casing and wedging of the collar upon the spring holds it fixedly in place.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In combination, a generally cylindrical body, a flexible annulus loosely embracing said body, at least a portion of said annulus comprising a helical tension spring whose axis is curved to conform to the exterior of the body, a helical spreader having its coils removably intermeshed with the coils of said spring to separate the latter against the normal tension of the spring and consequently expand said annulus, whereby said annulus is slack about the periphery of said body, said spring effective to contract due to its tension upon removal of said helical spreader from between the spring coils, thereby to cause said annulus to snugly hug and elastically grip the exterior of said body.

2. In a device of the character described, a flexible annulus, at least a portion of said annulus comprising a helical tension spring whose axis is curved to conform to the curvature of the annulus, a helical spreader having its coils removably intermeshed with the coils of said spring to separate the latter against the normal tension of the spring and consequently expand the annulus, said spring effective to contract due to its tension upon removal of said helical spreader from between the spring coils and thus reduce the circumferential length of the annulus.

3. In a device of the character described, a flexible annulus, at least a portion of said annulus comprising a helical tension spring whose axis is curved to conform to the curvature of the annulus, a helical spreader having its coils intermeshed with the coils of said spring to separate the latter against the normal tension of the spring and consequently expand said annulus, an elongate member extending axially of the two helices to normally maintain the coils of said spring and spreader intermeshed, said member being shiftable axially to remove same from the helices thereby to permit removal of the spreader coils from their intermeshed relation with the coils of said spring, and thus permit contraction of the spring due to its normal tension.

4. In a device of the character described, a helical tension spring, a helical spreader having its coils removably intermeshed with the coils of said spring to separate the latter against the normal tension of the spring and consequently increase the length of the spring, a flexible element connecting the ends of said spring to form therewith an endless band of predetermined length in a circumferential direction, said spring effective to contract due to its tension upon removal of said helical spreader from between the spring coils, thus to reduce the circumferential length of said band.

5. In an external pipe fitting for a pipe wherein the pipe fitting includes an annular collar adapted to encircle the pipe and of an inside diameter making it slidable thereon, an elastic garter band within the collar comprising a helical tension spring element whose axis is curved to conform to the exterior curvature of the pipe, and means for maintaining said band stretched within said collar so that it is slack about the pipe and then releasing it from stretched condition so it hugs the pipe snugly, the collar having wedge means cooperating with said band when the latter is so released to resist longitudinal movement of the collar relative to the pipe; the improvement wherein said first means comprises a helical spreader having its coils removably intermeshed with the coils of said spring along a portion of the length of the latter in order to separate said spring coils against the normal tension of the spring and consequently maintain said band in stretched condition, said collar being provided with means forming a withdrawal opening through which said spreader can be removed from between the spring coils thereby to allow the garter band to contract and hug the pipe.

6. In an external stop fitting for a pipe wherein the fitting includes an annular collar adapted to encircle the pipe and of an inside diameter making it slidable thereon, an elastic garter band within the collar comprising a helical tension spring element whose axis is curved to conform to the exterior curvature of the pipe, and means for maintaining said band stretched within said collar so that it is slack about the pipe and then releasing it from stretched condition so it hugs the pipe snugly, the collar having wedge means cooperating with said band when the latter is so released to resist longitudinal movement of the collar relative to the pipe; the improvement wherein said first means comprises a helical spreader having its coils intermeshed with the coils of said spring to separate the latter against the normal tension in the spring and consequently expand the garter band, and including an elongate member extending axially of the two helices to normally maintain the coils of said spring and spreader intermeshed, said member being shiftable axially relative said coils to remove same from said helices and thereby permit removal of the spreader coils from their intermeshed relation with the coil spring, said collar being provided with an opening through which said elongate member is removable from the coils and the spreader is removable from between the spring coils thereby to allow the garter band to contract and hug the pipe.

7. A stop collar assembly for mounting tools on the exterior of a pipe or casing comprising a cylindrical sleeve having an inside diameter of a size to fit slidably upon the pipe or casing to which it is to be applied, the midsection of the sleeve having an internal diameter somewhat larger than the diameter adjacent its ends forming inclined surfaces tapering inwardly from the midsection, said sleeve having an opening at a point intermediate its ends, an elastic garter band within said collar and substantially concentric therewith, a circumferential portion of said band being disposed in register with said slot, said portion comprising a helical tension spring, a helical spreader having its coils removably intermeshed with the coils of said spring to spread the latter apart against the normal tension of the spring and thus expand said band, and said spreader also having an end portion extending through the opening and along the exterior of the collar to facilitate removal of the spreader from said intermeshed relation with the spring.

8. A stop collar assembly for mounting tools on the exterior of a pipe or casing comprising a cylindrical sleeve having an inside diameter of a size to fit slidably upon the pipe or casing to which it is to be applied, the midsection of the sleeve having an internal diameter somewhat larger than the diameter adjacent its ends forming inclined surfaces tapering inwardly from the midsection, said sleeve having an opening at a point intermediate its ends, an elastic garter band within said collar and substantially concentric therewith, a circumferential portion of said band being disposed in register with said opening, said portion comprising a helical tension spring, a helical spreader having its coils removably intermeshed with the coils of said spring to spread the latter apart against the normal tension of the spring and thus expand said band, an elongate member extending axially and centrally through the spring and spreader to normally maintain the coils of the spring and spreader intermeshed, said member extending outwardly through said opening and being shiftable axially to remove same from the coils of the spreader and spring thereby to permit removal of the spreader coils from their intermeshed relation with the coils of said spring.

References Cited in the file of this patent

UNITED STATES PATENTS

| | | |
|---|---|---|
| 266,529 | Root | Oct. 24, 1882 |
| 1,847,378 | Browning | Mar. 1, 1932 |
| 2,137,429 | Voss | Nov. 22, 1938 |
| 2,184,376 | Beyer et al. | Dec. 26, 1939 |